US 6,543,383 B1

(12) United States Patent
Cote

(10) Patent No.: US 6,543,383 B1
(45) Date of Patent: Apr. 8, 2003

(54) TUBE BIRD FEEDER

(76) Inventor: Paul Cote, 18 Valleyview Rd, P.O. Box 64, Knowlton, Qubec (CA), J0E 1V0

( * ) Notice: Subject to any disclaimer, the term of this patent is extended or adjusted under 35 U.S.C. 154(b) by 0 days.

(21) Appl. No.: 10/162,099

(22) Filed: Jun. 4, 2002

(51) Int. Cl.⁷ ............................................. A01K 61/02
(52) U.S. Cl. ................................. 119/57.8; 119/52.2
(58) Field of Search ........................... 119/51.01, 52.1, 119/52.2, 57.8, 57.9

(56) References Cited

U.S. PATENT DOCUMENTS

| | | | | |
|---|---|---|---|---|
| 4,498,423 A | * | 2/1985 | Gainsboro et al. | 119/57.8 |
| 5,215,039 A | * | 6/1993 | Bescherer | 119/57.8 |
| 5,406,908 A | * | 4/1995 | Burleigh | 119/57.8 |
| 5,881,675 A | * | 3/1999 | Shaffer | 119/52.2 |
| 6,374,772 B1 | * | 4/2002 | Brandt | 119/57.8 |
| 6,408,788 B1 | * | 6/2002 | Lieb et al. | 119/52.2 |

* cited by examiner

Primary Examiner—Charles T. Jordan
Assistant Examiner—Elizabeth Shaw
(74) Attorney, Agent, or Firm—Eric Fincham

(57) ABSTRACT

A tube bird feeder comprising a seed container having a side wall and an opening at the top thereof to fill the seed container, at least one feed access opening in the side wall, a seed port structure removably connected to the side wall proximate the feed access opening, the seed port structure having a seed baffle, and at least one perch member, said perch member being removably secured to the side wall such that the perch member locks the seed port structure in position. The assembly may be easily dismantled for cleaning and there are also provided a plurality of vents for the interior of the seed container.

19 Claims, 11 Drawing Sheets

FIG. 7
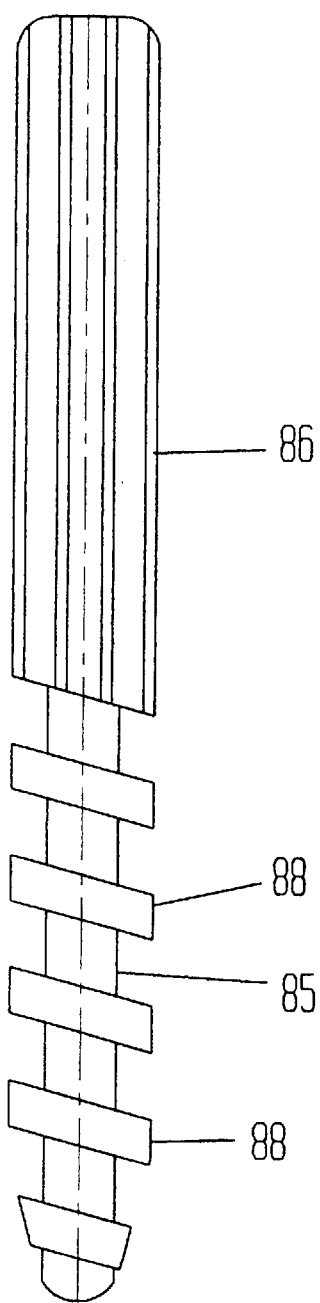
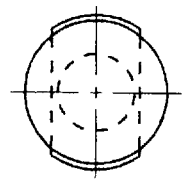
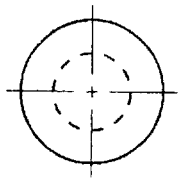
FIG. 7A
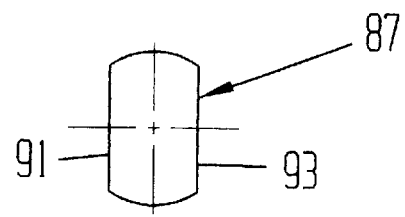

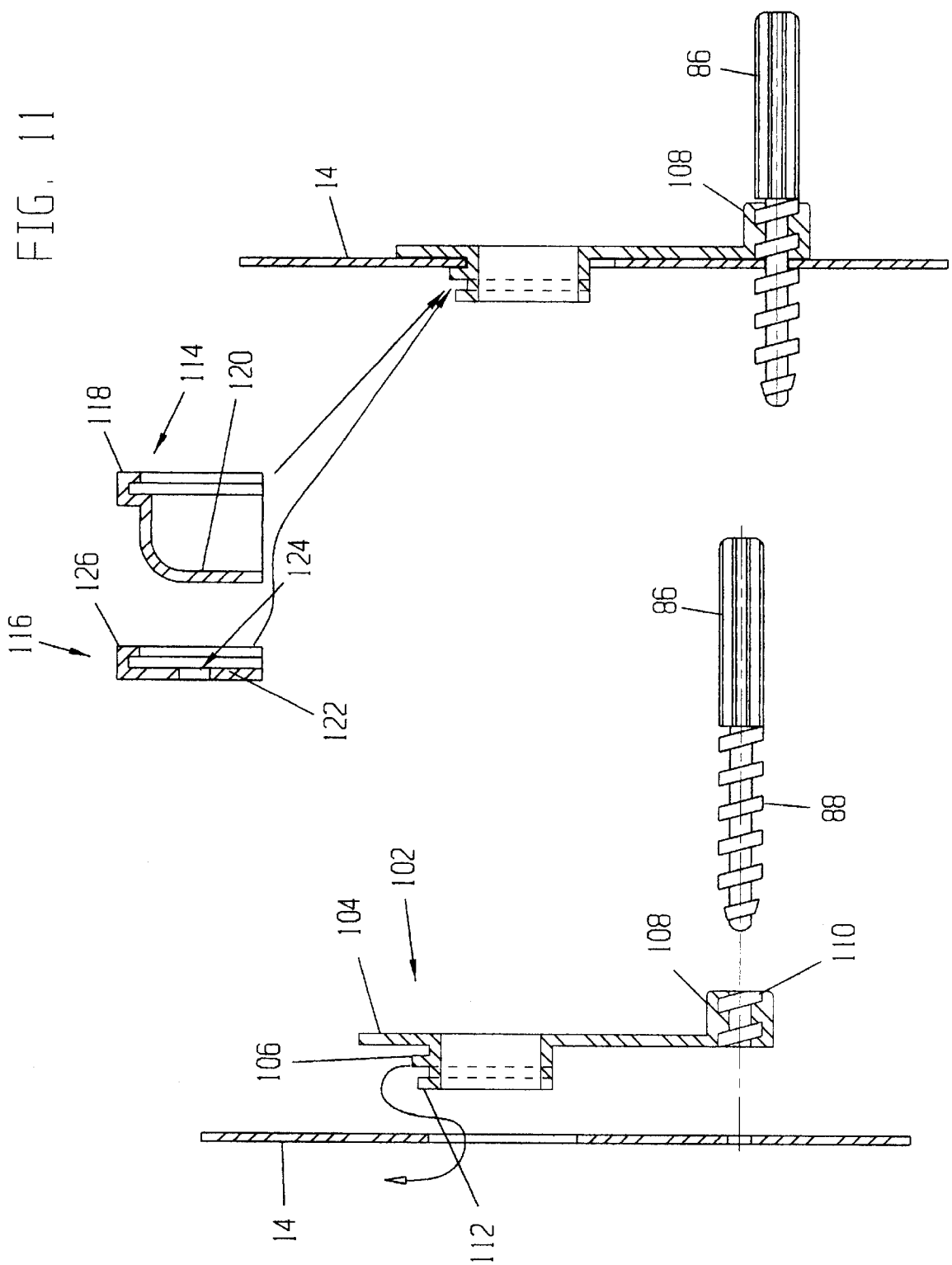

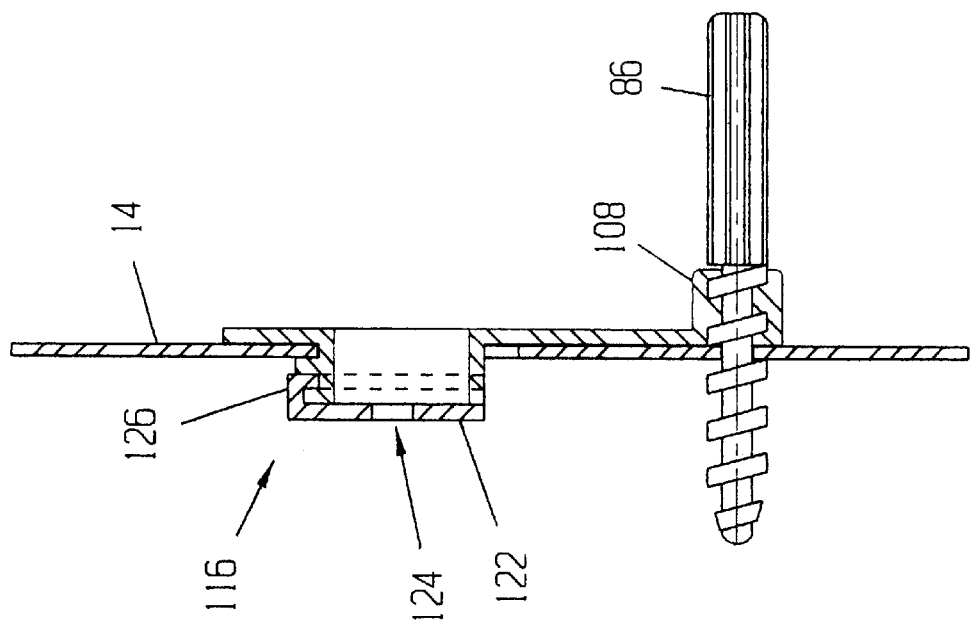
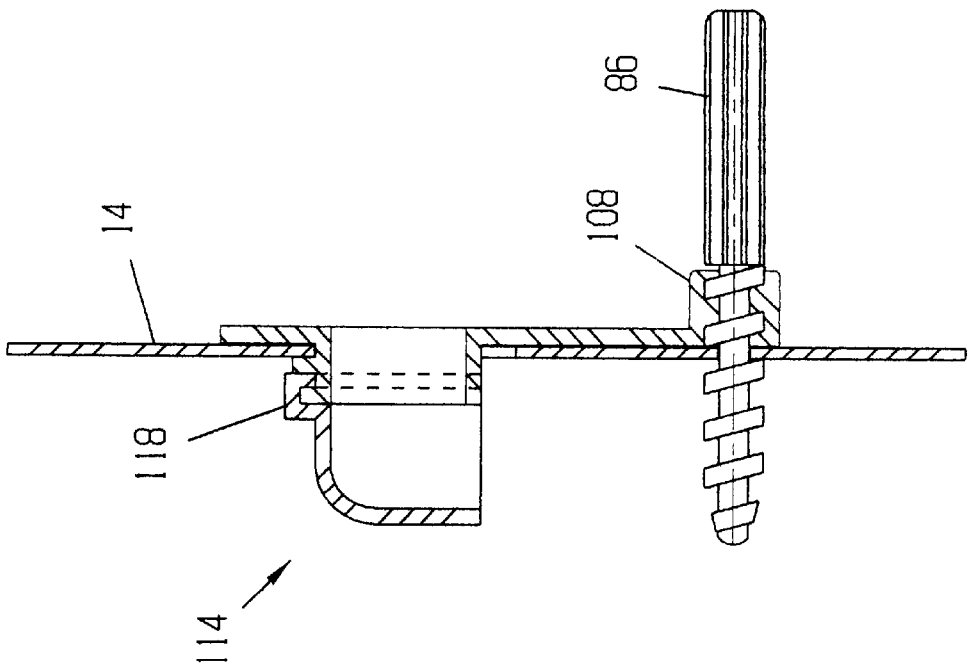

TUBE BIRD FEEDER

FIELD OF THE INVENTION

The present invention relates to bird feeders and more particularly, relates to improvements in tube bird feeders.

BACKGROUND OF THE INVENTION

The practice of feeding birds both during winter and year around is growing as people derive pleasure in having birds visit the feeder which is usually located close to the house of the user. Over the years, many different types of feeders have been developed, ranging from straight tray feeders on which the bird feed is placed to various types of containers having feed access openings therein.

The most basic bird feeders and the most inexpensive usually comprise a cylindrical tube, closed at the bottom and having feed access openings in the side wall and equipped with a removable cover. Perches usually extend through diametrically opposed apertures in the side wall of the feeder and are retained by nuts or caps or by means of a press fit.

More complex feeders have squirrel proof features and these feeders, due to the mechanisms required, are substantially more expensive.

One problem which has begun to receive increasing attention is the question of wild bird health. In particular, it has been found that many bird feeders are a source of contamination and the resulting spread of disease among the wild bird population. This is frequently due to the fact that the bird feeders are dirty, both from bird droppings and other sources. Rancid seed from exposure to the elements is also a major problem. Naturally, this could be overcome by regular cleaning of the bird feeder, but most commercially available bird feeders are not designed to be readily cleaned.

SUMMARY OF THE INVENTION

It is an object of the present invention to provide a relatively inexpensive bird feeder which can be easily assembled and disassembled for cleaning purposes.

According to one aspect of the present invention, a bird feeder comprising a seed container having a side wall and an opening at the top thereof, at least one feed access opening in the side wall, a seed port structure having a seed baffle removably connected to the side wall proximate the feed access opening, and at least one perch member, the perch member being removably secured to the side wall such that the perch member locks the seed port structure in position.

The feed container may be of any desirable configuration, although conventionally, a cylindrical configuration is utilized. However, it will be understood that it is well within the skill of one knowledgeable in the art to fabricate the container in various configurations including rectangular, square, oval, etc. The feed container is preferably formed of a transparent material such that visual access may be had to the contents of the container. Various suitable transparent plastics are known in the art.

The cover structure is sized to fit over the open upper end of the feed container and again, many conventional types of covers may be utilized. The cover may be locked to the container by different means including using a screw threaded engagement or alternatively a hanging member may be utilized on which the cover will slide. Needless to say, it is desirable that access can be gained to the container from the top in order to replenish the feed within the feed container.

The bottom of the feed container is closed in order to maintain the bird feed within the container. Again, while many different bottoms may be utilized, in a preferred embodiment of the present invention there is provided a base sized to fit within the container and which base may be designed to receive a seed catching tray/baffle as will be described herein with respect to the preferred embodiment.

As aforementioned, feeders provide feed access openings in the side wall of the feed container. Typically, these feed access openings are provided with a seed port structure having a baffle located above the feed access opening and extending downwardly inside the tube to prevent the seed from falling out.

According to the present invention, there is provided a seed port structure for each feed access opening. The seed port structures are removably secured to the side wall such that they may be removed for cleaning purposes. While it will be understood that different means of securing the seed port structure to the side wall may be utilized, in a preferred embodiment each seed port structure is held in place by means of a perch member.

The perch members, in the preferred embodiment of the present invention, are adjustable in length. By using adjustable length perches, the bird feeder can be adjusted to either accept or not accept larger birds.

The perch member preferably extends through the seed port structure and is screw threadedly engageable with the side wall of the bird feeder. The perch member will thus act as the element which secures the seed port structure to the feed container side wall.

Preferably, in one embodiment, the side wall of the feed container has an aperture to receive the screw threaded end of the perch member and which aperture is sized to act as a mating screw threaded portion. In other words, at least a portion of the aperture is sized to have a diameter less than the diameter of the screw threads of the perch member and equal to or slightly larger than the root diameter of the screw threaded portion. The screw threads are designed to have a pitch which will assure proper engagement of the screw threads with the side wall.

In a further embodiment of the present invention, the screw threaded end of the perch member engages a perch guide portion of the seed port structure in a screw threaded manner and merely extends through the side wall of the feed container.

The bird feeder of the present invention is designed to be easily assembled and disassembled to facilitate and encourage regular cleaning of the same. The parts can be placed in an ordinary dishwasher and then reassembled.

The bird feeder of the present invention also provides vent openings located at both the top and bottom. This will permit and encourage passage of air through the seed container which will help to dry out any moisture and thereby prevent spoilage of the food. The vent openings will also permit cooling of the inside of the container to prevent the build-up heat from solar energy and which heat would again increase the spoilage of the feed. Thus, by providing vent openings located at both the top and the bottom, convection currents will occur upon the heating of the interior of the feed container. The hotter air will escape through the top vent openings permitting cooler air to enter from the bottom vent openings and also the feed access openings.

BRIEF DESCRIPTION OF THE DRAWINGS

Having thus generally described the invention, reference will be made to the accompanying drawings illustrating an embodiment thereof, in which:

FIG. 4A is a cross sectional view taken along the lines A—A of FIG. 4;

FIG. 7 is an elevational view of a perch member used in the bird feeder of the present invention;

FIG. 7A systematically illustrates the shape of the opening to receive the perch member in the side wall of the feed container;

FIG. 10 is an exploded partial cross sectional view of a modified form of a seed port structure;

FIG. 11 is a cross sectional view of the seed port structure of FIG. 10 and a partially assembled configuration;

FIG. 12 is a view similar to FIG. 11 showing securement of a first type of baffle to the seed port structure; and FIG. 13 is a cross sectional view illustrating the securement of a different type of baffle to the seed port structure.

DESCRIPTION OF THE PREFERRED EMBODIMENTS

Figure 1:
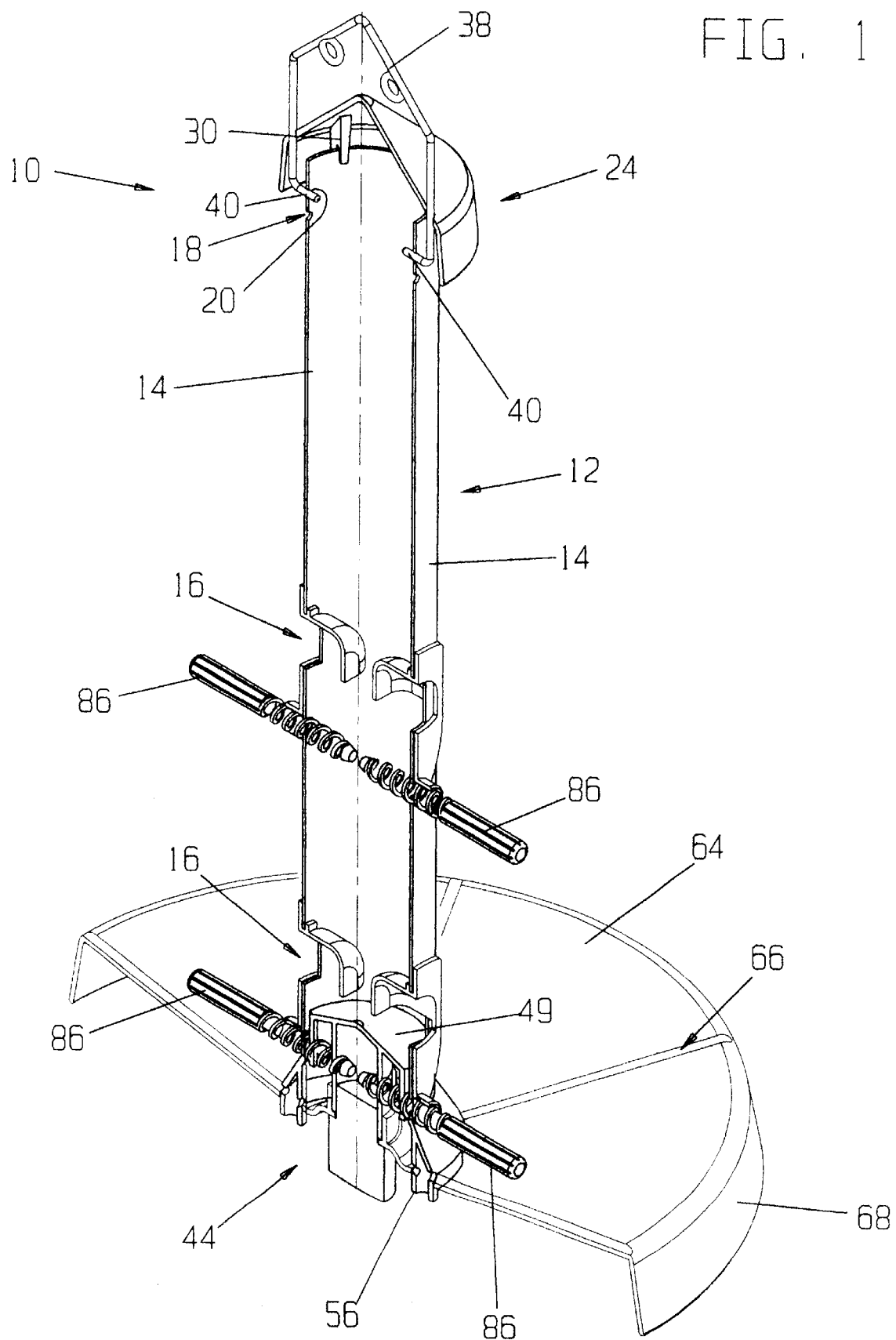
FIG. 1 is a perspective cut away view of a bird feeder according to one embodiment of the present invention.
Figure 2:
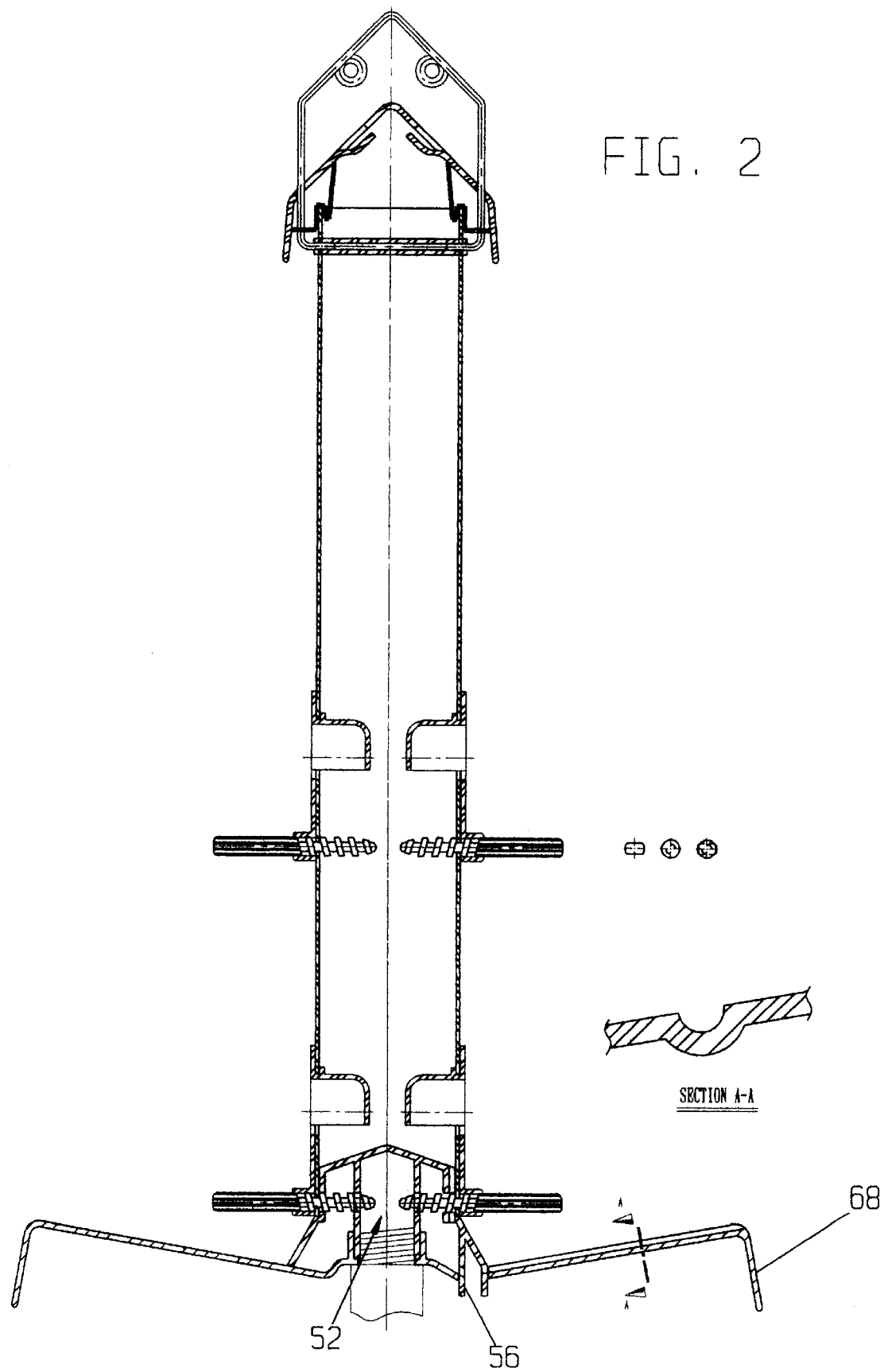
FIG. 2 is a cross sectional view thereof.

Referring to the drawings in greater detail and by reference characters thereto, there is illustrated in FIG. 1 a bird feeder generally designated by reference numeral 10. Bird feeder 10 has a generally cylindrical seed container 12 with a plurality of feed access openings 16 formed therein.

Also provided in side wall 14 of seed container 12 are a plurality of upper vent apertures 18 and a pair of hanger apertures 20.

Figure 3:
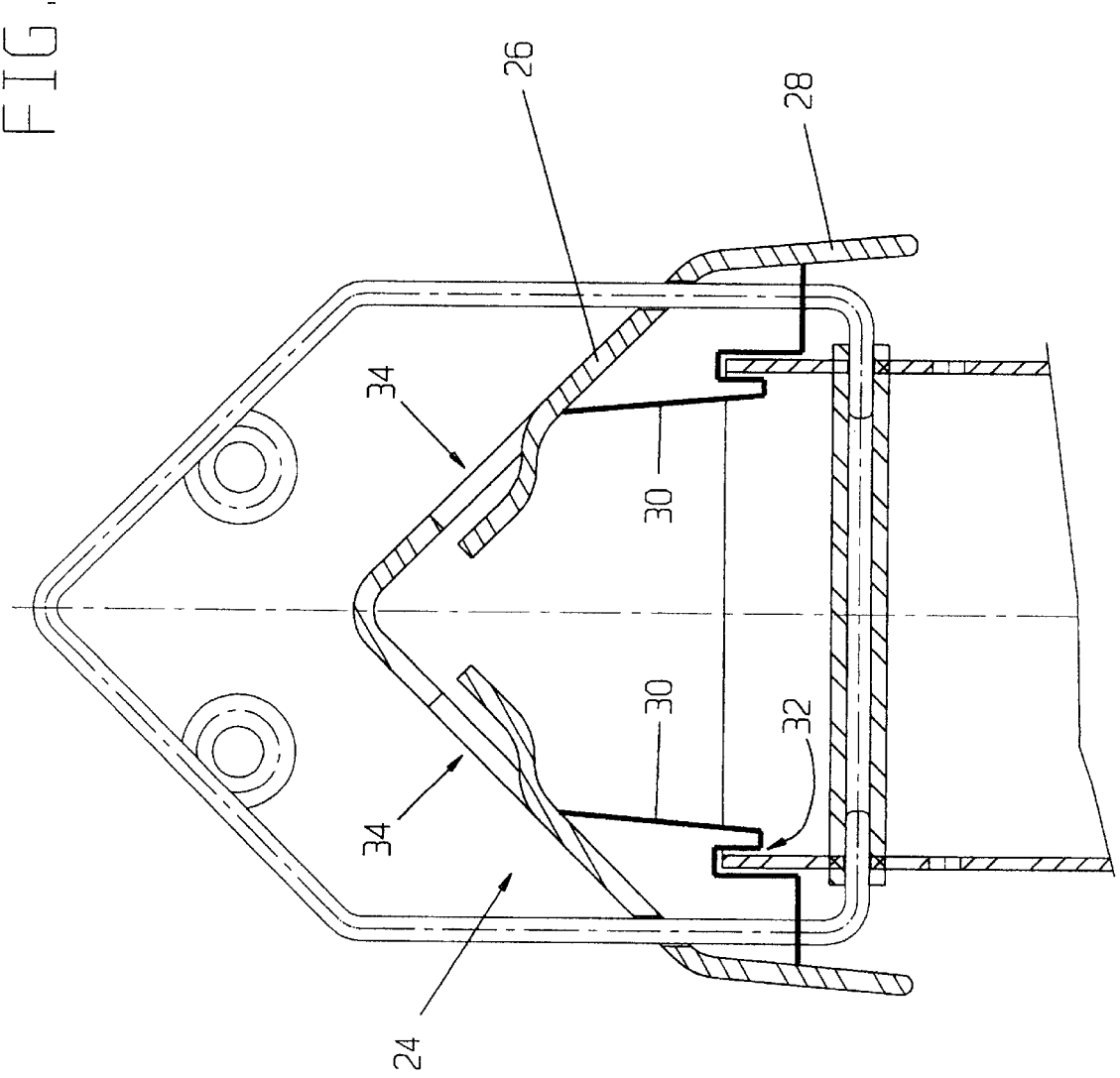
FIG. 3 is an enlarged cross sectional view of the upper portion of the bird feeder.

A cover generally designated by reference numeral 24 has an inverted conical configuration with a sloping upper wall 26 and a downwardly extending lower side wall 28. Formed on the interior of cover 24 (FIG. 3) are a plurality of ribs 30, each of the ribs 30 having a recess 32 formed therein adapted to accommodate and receive the upper portion of side wall 14 of seed container 12 while providing ventilation between cover 24 and side wall 14.

Cover 24 includes a plurality of cover vent openings 34 formed therein. In this respect, as may be seen in FIG. 3, each vent opening is designed to be substantially waterproof from rain and the like.

A hanger 38 is provided for hanging the bird feeder 10 from a suitable mount and to this end, hanger 38 has a pair of inwardly extending end portions which extend through hanger apertures 20 in side wall 14.

Figure 4:
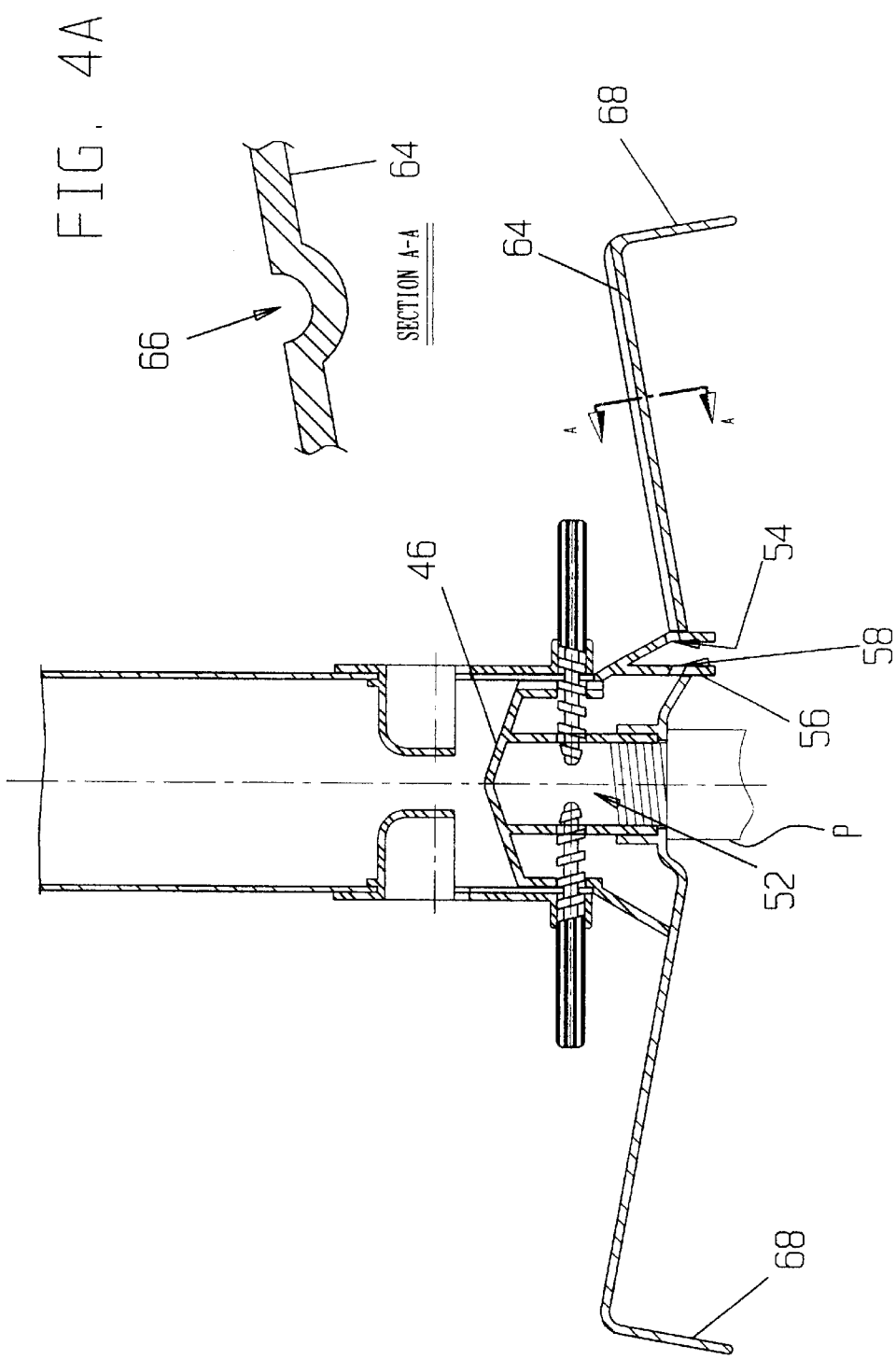
FIG. 4 is an enlarged cross sectional view of the lower portion of the bird feeder according to the present invention.
Figure 5:
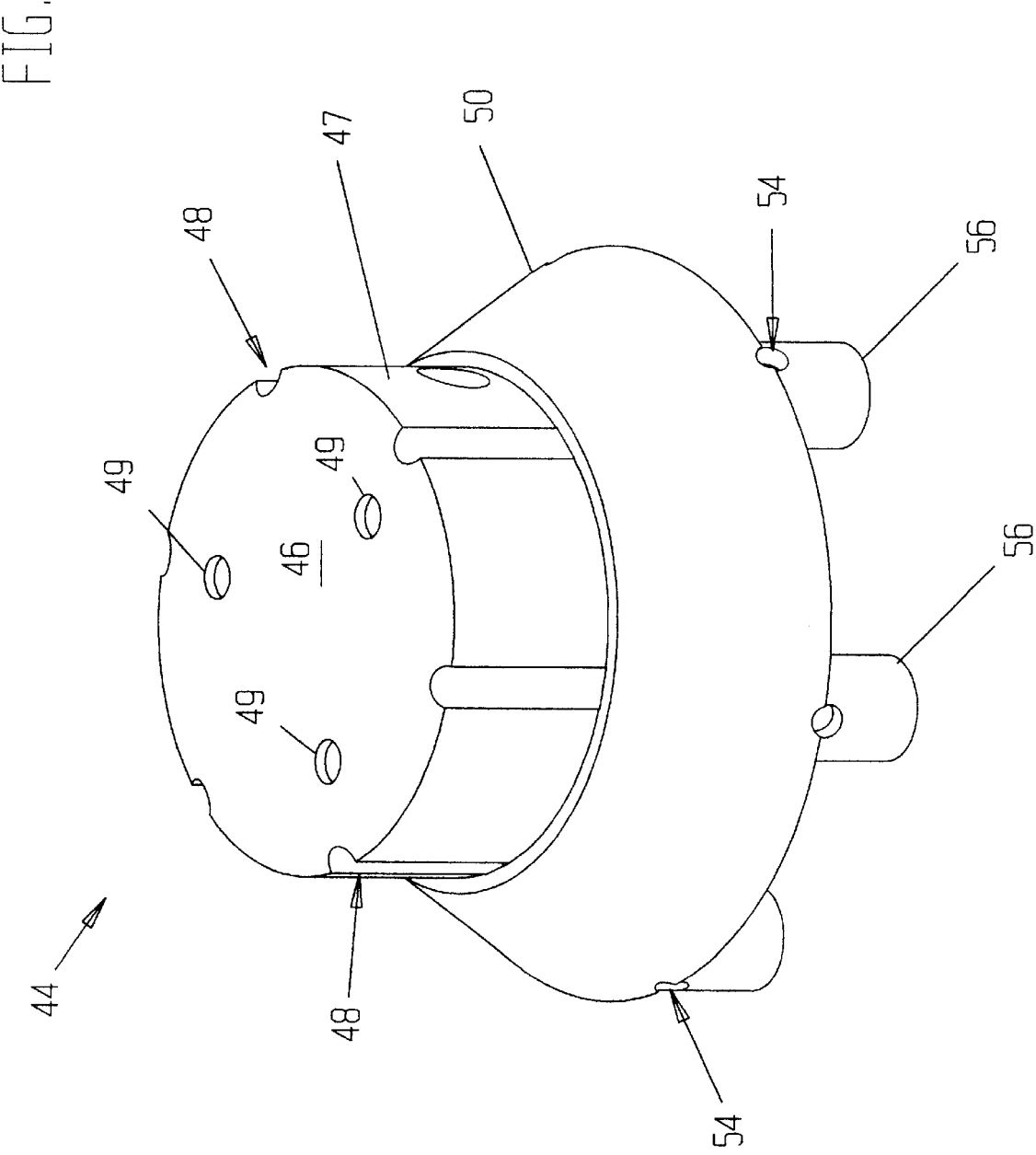
FIG. 5 is a perspective view of the base member used in the bird feeder according to the present invention.

Bird feeder 10 also includes a base member generally designated by reference numeral 44. Base member 44 has a dome shaped upper wall 46 and a downwardly extending side wall 47. A skirt 50 extends outwardly from side wall 47; there are provided a plurality of vertically extending drainage channels 48 on side wall 47. As may be seen in FIG. 4, formed within skirt 50 are a plurality of skirt drainage apertures 54 for reasons which will become apparent hereinbelow.

Base member 44 also includes an inner threaded wall 52 which is designed to receive a mounting post P. Also provided between skirt 50 and inner threaded wall 52 are cylindrical structures 56 which also have drainage apertures 58 therein to permit drainage which occurs through drainage channels 48 and to also permit the flow of air upwardly into seed container 12. Centrally located drainage apertures 49 are also provided.

The bird feeder also includes a baffle/seed tray 64 which has a plurality of drainage grooves 66 formed in the upper surface thereof. A downwardly extending wall 68 is located at the periphery of baffle/seed tray 64.

Baffle/seed tray 64 performs the dual function of collecting seeds and/or seed portions on the upper surface thereof which may have fallen from feed access opening 16. It also acts as a squirrel baffle to prevent squirrels from accessing the seeds when the bird feeder 10 is mounted on a pole P. Thus, baffle/seed tray 64 has a bottom surface which does not have any openings near the exterior wall 68 and which is smooth to prevent a squirrel gaining any grip thereon. Base member 44 is preferably of a metallic material and as it provides drainage with apertures which extend beyond tray 64, it cannot easily be chewed by the squirrels.

Figure 6:
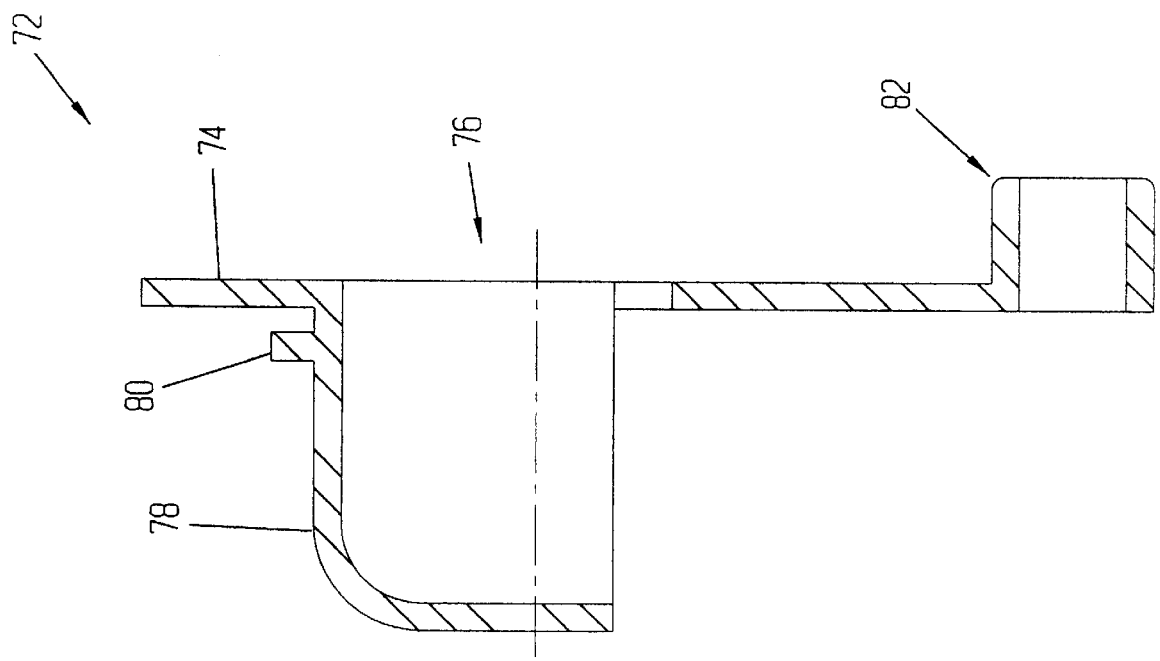
FIG. 6 is a cross sectional view of the seed port structure.
Figure 8:
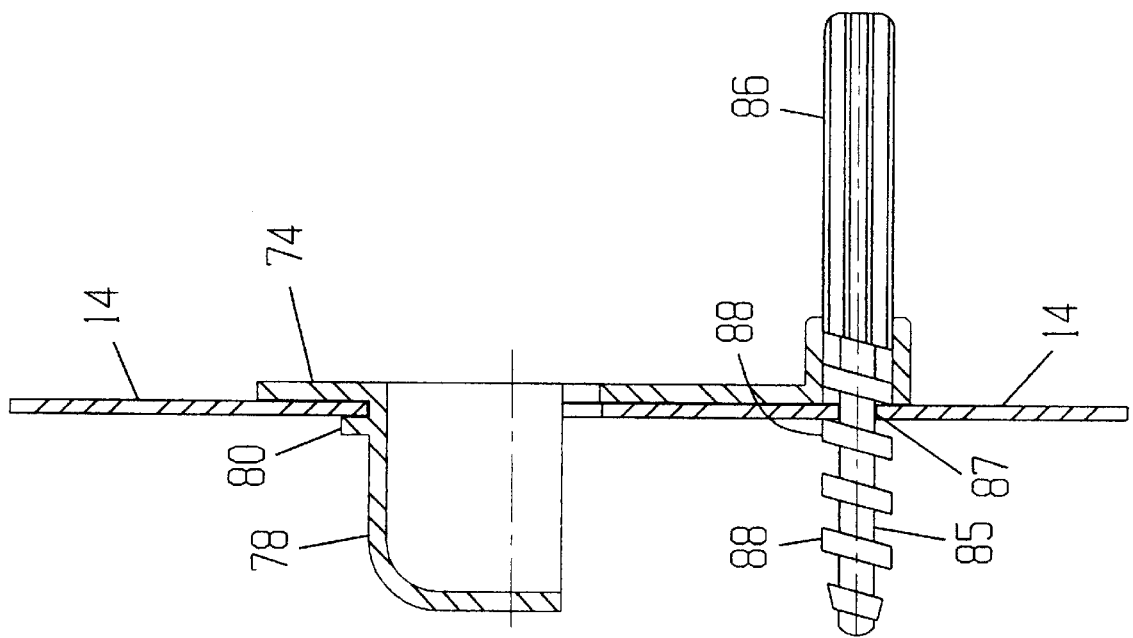
FIG. 8 is an enlarged cross sectional view illustrating assembly of the perch and seed port structure.
Figure 9:
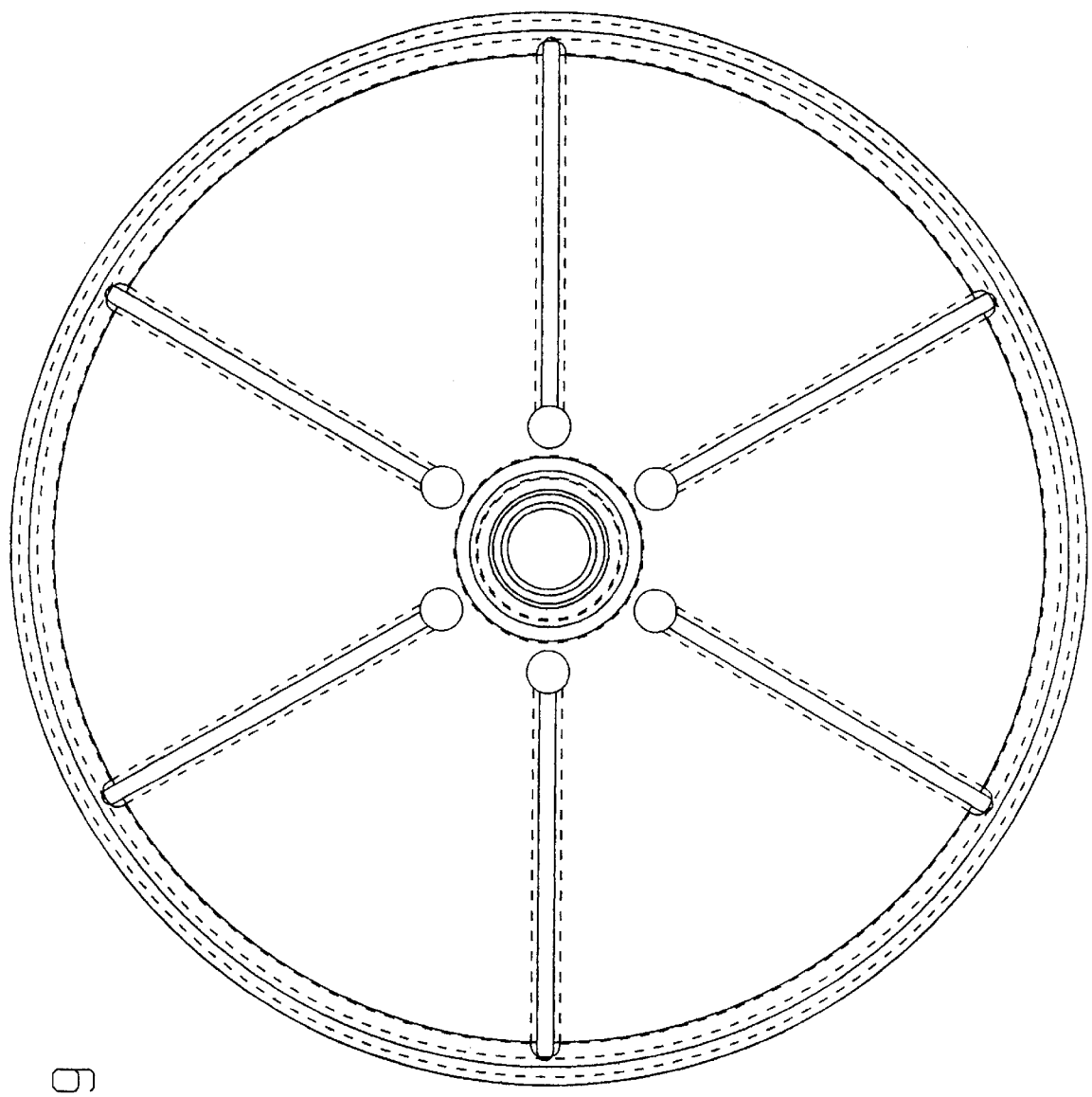
FIG. 9 is a top plan view of the combined baffle and seed tray.

Bird feeder 10 includes a plurality of seed port structures 72, each seed port structure 72 being associated with a respective feed access opening 16 in side wall 14 of seed container 12. As may be seen in FIG. 6, each seed port structure 72 has a side wall 74 having an opening 76 formed therein and which opening 76 is designed to be in registry with seed access opening 16 in side wall 14. Seed port structure 72 includes a conventional baffle structure 78 to prevent seeds from falling out through seed access opening 76. A retaining tab 80 is formed on baffle 78 adjacent side wall 74 and being spaced from side wall 74 a distance approximately equal to the thickness of side wall 14 of seed container 12. At the lower end of side wall 74, there is provided a cylindrical perch guide 82 for reasons which will become apparent hereinbelow.

A perch member 86 is associated with each seed port structure 72 and as may be seen in FIG. 7, each perch member 86 has a plurality of screw threads 88 at one end thereof extending spirally from root 85. There are provided openings 87 in side wall 14 of seed container 12 to receive perch members 86. Reference may initially be had to FIG. 7A which shows the configuration of openings 87—as noted, there are provided a pair of side marginal edges 91 and 93 which are spaced apart a distance approximately equal or slightly greater than the diameter of root 85. They are smaller than flites or screw threads 88.

In assembling the device, seed port structure 72 is placed such that side wall 14 fits between retaining tab 80 and side wall 74 of seed port structure 72 with their respective openings being in registry. A perch member 86 is inserted through perch guide 82 and screw threads 88 are sized such that they will grip the side wall 14 of seed container 12. In other words, the shape of openings 87 forms the structure necessary to receive threads 88 and thereby ensure that seed port structure 72 is retained in position. It will also be appreciated that perch members 86 are adjustable inwardly and outwardly such that the effective length of the perch may be adjusted.

A modified seed port structure is illustrated in FIGS. 10 to 13 and reference will now be had thereto. A detachable seed port structure 102 has a side wall 104 similar to the previously described seed port structure. A first retaining tab 106 extends upwardly and together with side wall 104 is designed to receive side wall 14 of the seed container. On the other side of tab 106 a second tab member 112 is formed for reasons which will become apparent hereinbelow. Situated at the lower end of seed port structure 102 is a perch guide 108 which has internal screw threads 110 designed to receive screw threads 88 on perch 86.

As may be seen in FIG. 11, there are provided first and second baffle members generally designated by reference numerals 114 and 116 respectively. Baffle member 114 is similar to that described in the previous embodiments and includes an upper inverted U-shaped portion 118 designed to seat between tab members 106 and 112 on seed port structure 102. Second baffle member 116 also includes an inverted U-shaped portion 126 designed to seat in a similar manner between tabs 106 and 112. However, it will be noted that baffle 116 only provides a relatively small opening 124 in a wall 122. This baffle is designed for use with smaller seed such as thistle seed.

As may be seen in FIGS. 12 and 13, either baffle member 114 and 116 may be used depending upon the contents of the feeder. In this embodiment, it will be noted that perch member 86 is screw threadedly engaged with perch guide 108 rather than with side wall 14.

It will be understood that the above described embodiments are for purposes of illustration only and that changes or modifications may be made thereto without departing from the spirit and scope of the invention.

I claim:

1. A bird feeder comprising:
    a seed container having a side wall and an opening at the top thereof;
    at least one feed access opening in said side wall;
    a seed port structure including a seed baffle removably connected to said side wall proximate said feed access opening; and
    at least one perch member, said perch member being removably secured to said side wall such that said perch member secures said seed port structure in position.

2. The bird feeder of claim 1 further including a cover member sized to fit over said opening in said top of said seed container and being removably secured thereto.

3. The bird feeder of claim 2 wherein said cover member has portions thereof spaced from said seed container to permit air flow from said seed container.

4. The bird feeder of claim 2 wherein said cover member includes at least one air vent opening therein.

5. The bird feeder of claim 4 wherein said side wall of said seed container has a plurality of vent openings therein, said vent openings being located in an upper portion of said side wall.

6. The bird feeder of claim 2 further including a base member, said base member having vertical drainage channels to permit drainage of said seed container and to permit passage of air through said seed container.

7. The bird feeder of claim 6 further including a seed tray located at the bottom of said feeder, said seed tray extending outwardly from said side wall to act as a baffle to prevent squirrels from accessing said seed container.

8. The bird feeder of claim 7 wherein said seed tray has a smooth bottom surface to prevent squirrels from grasping thereon.

9. The bird feeder of claim 7 wherein said seed tray has an inwardly sloping upper surface to direct water and seed to an inner area thereof.

10. The bird feeder of claim 9 further including generally horizontal drainage openings formed in said base member, said inwardly sloping upper surface having drainage grooves therein, said generally horizontal drainage openings being in fluid communication with said drainage grooves formed on said seed tray.

11. The bird feeder of claim 10 wherein said base member is formed of a metallic material.

12. The bird feeder of claim 6 wherein said base member is formed of a metallic material.

13. The bird feeder of claim 6 wherein said vertical drainage channels are located at a peripheral edge of said base member and also extends downwardly from a bottom wall of said base member.

14. The bird feeder of claim 1 wherein said perch member is screw threadedly engaged with said side wall.

15. The bird feeder of claim 1 wherein said perch member comprises an elongated rod, said elongated rod having screw threads located at one end thereof, said feed container having an opening located lower than said feed access opening for receiving said screw threads, said opening having at least a portion thereof with a diameter substantially equal to the root diameter of said screw threaded portion such that said screw threads will engage said side wall.

16. The bird feeder of claim 15 wherein said bird feeder has a plurality of feed access openings, each feed access opening having an associated seed port structure and perch member.

17. The bird feeder of claim 15 wherein said seed port structure has a non-screw threaded opening to receive said perch member.

18. The bird feeder of claim 1 wherein said seed baffle is removably connected to said seed port structure.

19. The bird feeder of claim 1 wherein said perch member is screw threadedly engaged with said seed port structure and extends inwardly through said side wall of said seed container.

* * * * *